(12) United States Patent
Dewan et al.

(10) Patent No.: US 10,816,642 B2
(45) Date of Patent: Oct. 27, 2020

(54) CIRCUITRY, SENSOR SYSTEM, METHOD OF GENERATING A VOLTAGE, AND METHOD OF OPERATING A SENSOR SYSTEM

(71) Applicant: Infineon Technologies AG, Neubiberg (DE)

(72) Inventors: Ketan Dewan, Unterhaching (DE); Reinhard Kussian, Klagenfurt (AT); Juergen Schaefer, Oberhaching (DE)

(73) Assignee: Infineon Technologies AG, Neubiberg (DE)

( * ) Notice: Subject to any disclaimer, the term of this patent is extended or adjusted under 35 U.S.C. 154(b) by 228 days.

(21) Appl. No.: 16/011,657

(22) Filed: Jun. 19, 2018

(65) Prior Publication Data

US 2018/0364326 A1    Dec. 20, 2018

(30) Foreign Application Priority Data

Jun. 20, 2017   (DE) .......................... 10 2017 113 567

(51) Int. Cl.
| | | |
|---|---|---|
| *G01S 7/282* | (2006.01) | |
| *G01S 7/03* | (2006.01) | |
| *G01S 13/931* | (2020.01) | |

(52) U.S. Cl.
CPC .............. *G01S 7/282* (2013.01); *G01S 7/032* (2013.01); *G01S 13/931* (2013.01)

(58) Field of Classification Search
CPC ........ G01S 7/282; G01S 7/032; G01S 13/931; H04L 27/2697
USPC ....................................................... 342/200
See application file for complete search history.

(56) References Cited

U.S. PATENT DOCUMENTS

| | | | | |
|---|---|---|---|---|
| 6,456,219 | B1 * | 9/2002 | Schreiber .............. | H03M 3/458 341/143 |
| 6,958,717 | B1 * | 10/2005 | Minogue ................. | H03M 3/50 341/100 |
| 7,636,875 | B2 * | 12/2009 | Corsi ...................... | H04L 25/14 714/701 |
| 7,855,677 | B2 * | 12/2010 | Negoro ................... | H04J 13/10 342/159 |

(Continued)

FOREIGN PATENT DOCUMENTS

EP            0719478 B1 *    7/1998    ............. H03H 17/06

*Primary Examiner* — Peter M Bythrow
*Assistant Examiner* — Alexander L. Syrkin
(74) *Attorney, Agent, or Firm* — Viering, Jentschura & Partner mbB

(57) ABSTRACT

In various embodiments, a circuitry configured to generate a voltage is provided. The circuitry may include a sequence generator configured to provide a sequence of data words consisting of bits. The number of bits is greater than two. The circuitry may further include a delta-sigma modulator configured to receive the sequence of data words provided by the sequence generator and to provide a delta-sigma modulated first single bit data stream at a first data rate, and a decimation filter configured to generate a stream of decimated data words from the first single bit data stream at a second data rate. The second data rate may be smaller than the first data rate, each decimated data word including a plurality of bits. The circuitry may further include a parallel-to-serial converter configured to convert the decimated data words to a second single bit data stream while preserving the second data rate.

21 Claims, 8 Drawing Sheets

(56) References Cited

U.S. PATENT DOCUMENTS

| | | | |
|---|---|---|---|
| 9,264,064 B2* | 2/2016 | Saito | H03M 3/46 |
| 9,496,887 B1* | 11/2016 | Quiquempoix | G06F 1/3203 |
| 9,680,491 B2* | 6/2017 | Iwashita | G06F 13/4247 |
| 2003/0122692 A1 | 7/2003 | Roeckner et al. | |
| 2004/0151109 A1* | 8/2004 | Batra | H04L 1/0071 |
| | | | 370/208 |
| 2004/0263365 A1 | 12/2004 | Robinson et al. | |
| 2011/0050472 A1 | 3/2011 | Melanson | |
| 2013/0033330 A1* | 2/2013 | Longstone | H03L 7/22 |
| | | | 331/40 |
| 2015/0123828 A1* | 5/2015 | Alldred | H03M 3/442 |
| | | | 341/143 |
| 2015/0365102 A1* | 12/2015 | Ceballos | H03M 3/468 |
| | | | 341/143 |
| 2017/0366385 A1 | 12/2017 | Roger et al. | |

* cited by examiner

| Input to the compactor | 0 | 2 | 1 | 1 | 0 | 2 | 1 | 1 | 1 | 1 | 0 | 0 | 2 | 2 | 1 | 1 |
|---|---|---|---|---|---|---|---|---|---|---|---|---|---|---|---|---|
| Output from the compactor | 0 | 1 | 0 | 1 | 0 | 1 | 0 | 1 | 0 | 1 | 0 | 0 | 1 | 1 | 0 | 1 |

| Input to the Compactor | Output of the Compactor |
|---|---|
| $0_D$ | $0_B$ |
| $1_D$ | $0_B$ (at the start or if the previous output was 1) |
| $1_D$ | $1_B$ (if the previous output was 0) |
| $2_D$ | $1_B$ |

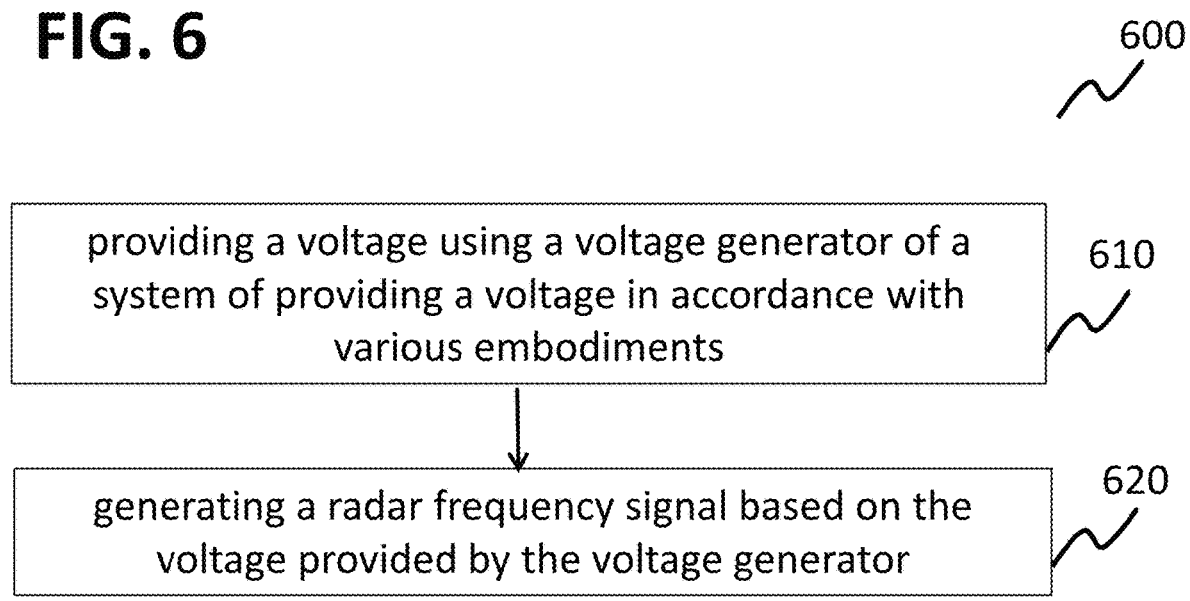

US 10,816,642 B2

CIRCUITRY, SENSOR SYSTEM, METHOD OF GENERATING A VOLTAGE, AND METHOD OF OPERATING A SENSOR SYSTEM

CROSS-REFERENCE TO RELATED APPLICATION

This application claims priority to German Patent Application Serial No. 10 2017 113 567.7, which was filed Jun. 20, 2017, and is incorporated herein by reference in its entirety.

TECHNICAL FIELD

Various embodiments relate generally to a circuitry, a sensor system, a method of generating a voltage, and a method of operating a sensor system.

BACKGROUND

In a radar system, as it may for example be used in an automotive application for detecting objects, e.g. in a vicinity of a vehicle, a monolithic microwave integrated circuit (MMIC), which may be operated at 24/77 GHz may need to be controlled for generating at an output a frequency modulated "chirp", which may then be transmitted, e.g. emitted towards an area where an object may be located. The MMIC may be controlled through an analog voltage with very tight signal-to-noise ratio requirements.

Conventionally, the MMIC may be controlled by forming a discrete phase-locked loop (PLL), wherein the MMIC may form a voltage controlled oscillator (VCO), and a phase frequency detector (PFD) and a charged pump may be formed in a microcontroller. This closed loop solution may suffer from design complexity, high power consumption, a large area consumption, and a high susceptibility to power supply noise through general purpose inputs/outputs (GPIOs).

SUMMARY

In various embodiments, a circuitry configured to generate a voltage is provided. The circuitry may include a sequence generator configured to provide a sequence of data words consisting of bits. The number of bits is greater than two. The circuitry may further include a delta-sigma modulator configured to receive the sequence of data words provided by the sequence generator and to provide a delta-sigma modulated first single bit data stream at a first data rate, and a decimation filter configured to generate a stream of decimated data words from the first single bit data stream at a second data rate. The second data rate may be smaller than the first data rate, each decimated data word including a plurality of bits. The circuitry may further include a parallel-to-serial converter configured to convert the decimated data words to a second single bit data stream while preserving the second data rate.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 4A and 4B show a mapping example and a mapping algorithm used by a parallel-to-serial converter of a circuitry configured to generate a voltage in accordance with various embodiments;

FIG. 6 shows a process flow of a method of operating a sensor system in accordance with various embodiments.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Figure 1:
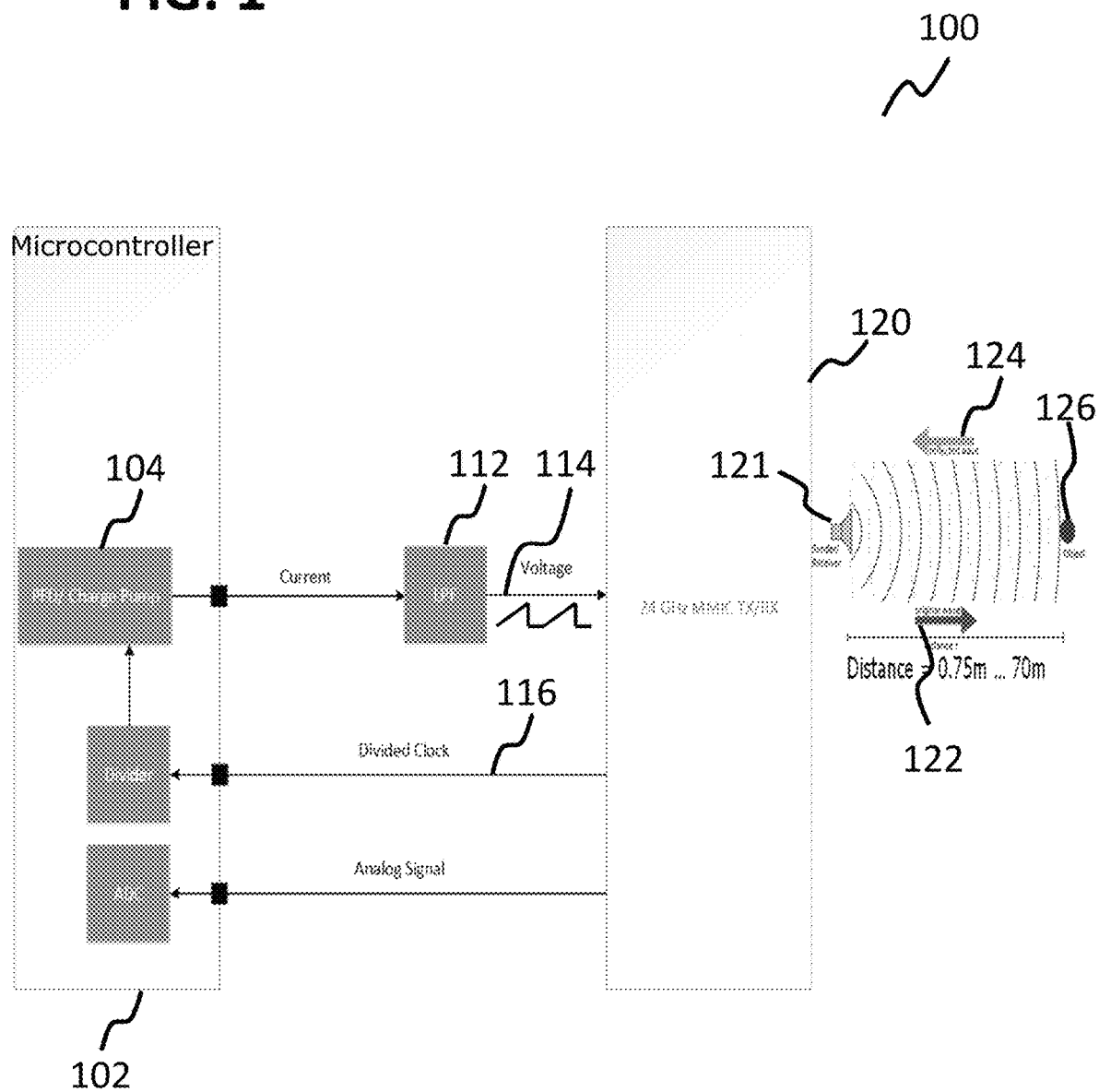
FIG. 1 shows a block diagram of a common circuitry configured to generate a voltage.

A common radar system, as it may for example be used in an automotive application or other devices, for example for detecting an object 126, e.g. in a vicinity of a vehicle (for example in a distance of between 0.75 m and 70 m), is shown in FIG. 1. A monolithic microwave integrated circuit (MMIC) 120, which may be operated at 24 GHz/77 GHz may need to be controlled for generating at an output a frequency modulated "chirp", which may then be transmitted, e.g. emitted towards an area where an object may be located (depicted as waves/arrow 122 propagating away from a sender/receiver 121). The MMIC 120 control may be conventionally be achieved by forming a discrete phase-locked loop (PLL), wherein the MMIC 120 may form a voltage controlled oscillator (VCO), and a phase frequency detector (PFD) and a charged pump (together labelled with 104) may be formed in a microcontroller 102.

The voltage-controlled oscillator (VCO) 120 may be an electronic oscillator whose oscillation frequency is controlled based on a voltage 114 input, e.g. on an analog voltage 114. In operation, the applied input voltage 114 may determine an instantaneous oscillation frequency of the VCO 120. Modulating signals may be applied to the VCO 120 input to cause frequency modulation (FM) of the oscillated output signal.

The VCO may generate a signal according to the oscillation frequency (e.g., transmission frequency) that may be used to drive the transmitter of the radar system 100 and may be mixed with a signal 124 (which may for example be reflected by the object 126) received by the radar system 100. Transmitters of radar systems 200 and 300, respectively, as shown in FIG. 2 and FIG. 3A, may be driven in a similar way by signals generated by their respective VCOs.

The analog voltage 114 may have very tight signal to noise ratio requirements. For this and other reasons, the closed loop solution may suffer from design complexity to drive current out of the chip, high power consumption, a large area consumption, and a high susceptibility to power supply noise through general purpose input/outputs (GPIOs). Also, an additional pin may be required for providing a feedback clock signal 116.

Figure 2:
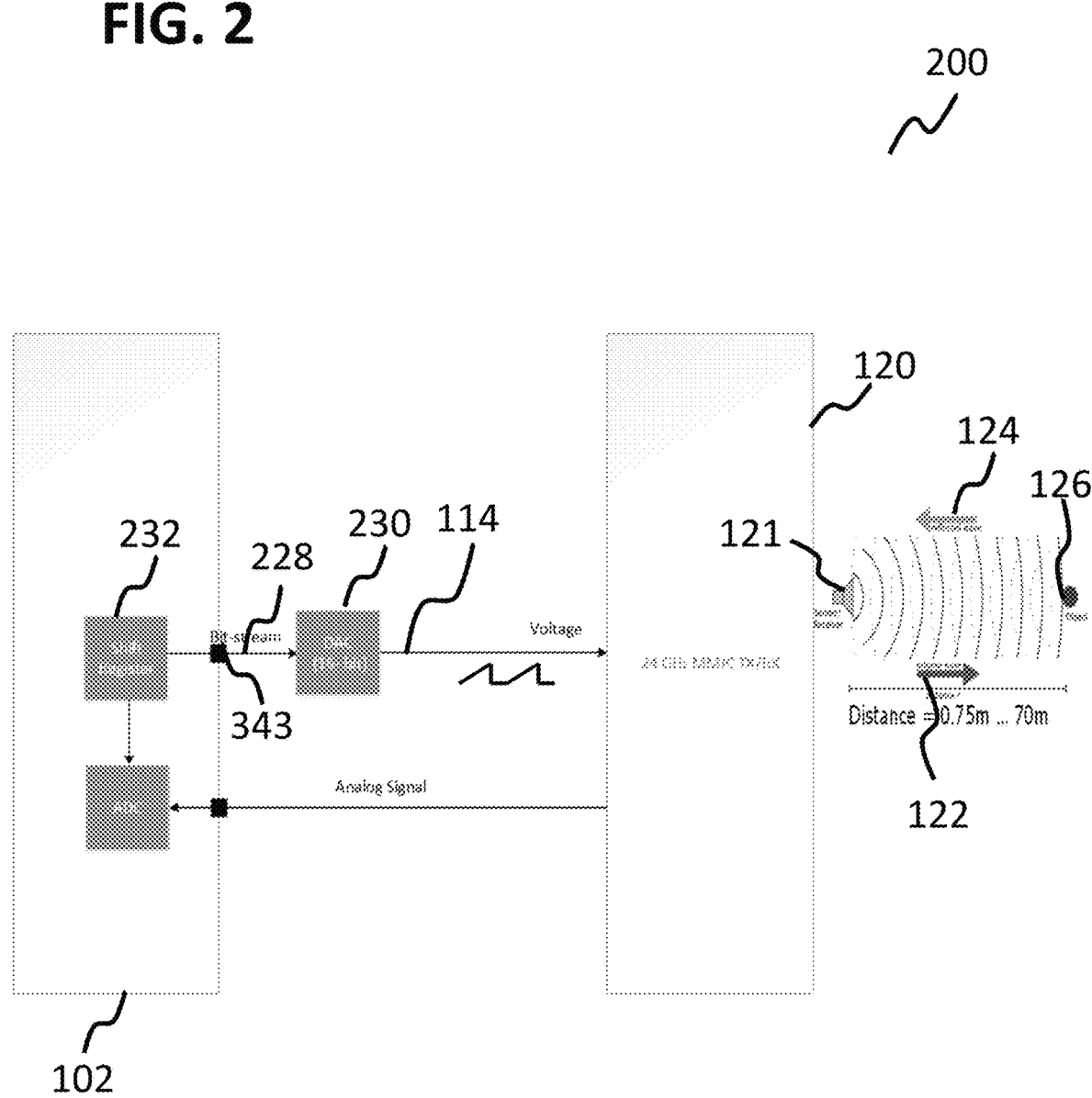
FIG. 2 shows a block diagram of a common circuitry configured to generate a voltage.
Figure 3A:
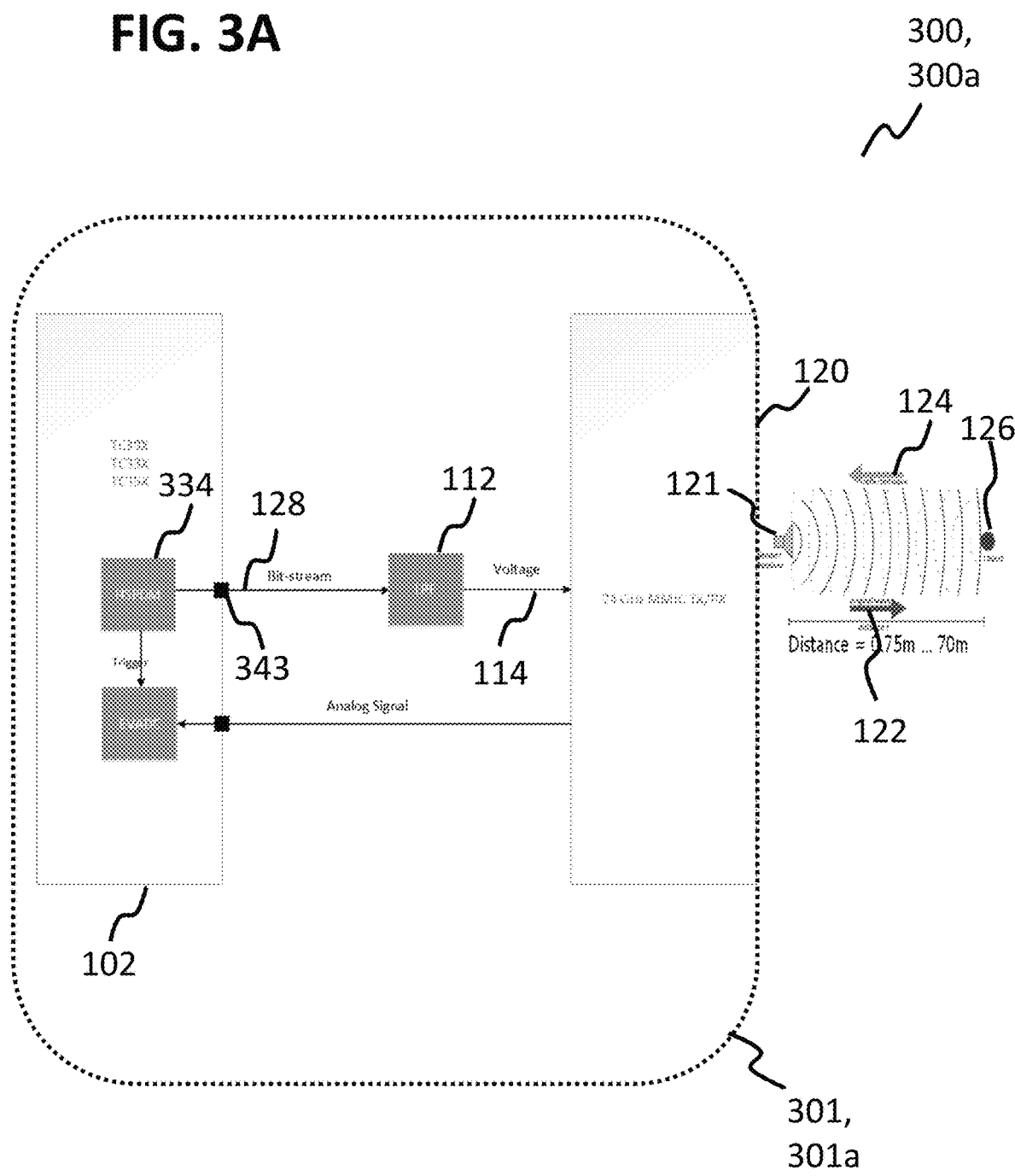
FIGS. 3A and 3B each show a block diagram of a sensor system including a circuitry configured to generate a voltage in accordance with various embodiments.

As shown in FIG. 2, an alternative using an open loop solution may use a shift register 232 to shift the bits, and a bit stream 228 output by the shift register 232 may then be converted into voltage 114 using a high-precision 16-bit digital-to-analog converter (DAC) 230. The downside is bill-of-materials (BOM) cost of approximately 2 $ per device.

In various embodiments, a high speed pulse density modulation module (HSPDM) 334 may be used to generate a pulse density modulated bit stream signal, which may be converted into voltage using a low pass filter. The voltage may in various embodiments control a VCO. In various embodiments, the output of the VCO may be a 24 GHz frequency modulated signal, a 77 GHz frequency modulated signal, or a modulated signal using any other suitable carrier frequency, e.g. 79 GHz or the like. The modulation on the 24 GHz carrier may be controlled by the HSPDM.

Various embodiments may target short range and middle range radar or 24/77 GHz radar based solution for automotive.

In various embodiments, an open loop circuit for generating a voltage may be provided, whereby a design complexity may be reduced. The power consumption of the open loop circuit may be much lower than the power consumption of the conventional circuit.

An impact of the power supply noise may be much lower than for the conventional circuit, because in various embodiments, the output of the microcontroller may be a high-speed bit stream which may then be converted into an analog voltage using a low pass filter (LPF) on the bit stream. The LPF may average the bit stream, thereby demodulating the output 128, in order to have an analog representation of the signal generated in 336. Therefore, high-frequency components may be attenuated and a band-limited output voltage may be achieved.

In various embodiments, to meet higher signal-to-noise ratio (SNR) requirements, a delta-sigma modulator may be running on a very high frequency, and may therefore require the general purpose input/output pads to support the very high-speed bit stream. To ease this requirement, a decimation filter (for example a cascaded integrator-comb filter (CIC filter)) may be used for lowering the data rate of the bit stream, for example by a factor of two.

In various embodiments, an output of the decimation filter (e.g. the CIC filter) may for example be a two-bit sample (a data stream of two-bit data words). The two-bit sample may not be directly connected to an output pad of the microcontroller. Therefore, the two-bit sample may be converted back to a one-bit sample (a single bit data stream) using a parallel-to-serial converter (also referred to as compactor). The parallel-to-serial converter (the compactor) may map the output of the decimation filter (e.g. the CIC filter) to either of two data values, e.g. to a '0' or a '1'.

In various embodiments, using the decimation filter (e.g. the CIC filter) and the parallel-to-serial converter (the compactor), the data rate may be reduced by half, and may be handled much easier by the input/outputs (IOs). This may also help in reducing the power consumption of the IOs, which may be a dominating power consumer for such a system.

In various embodiments, the circuitry configured to generate a voltage may be provided as a digital logic, such that an area (e.g. on a chip) occupied by such an implementation may be much smaller than that of a conventional PLL-based solution.

In various embodiments, a delta-sigma modulator (DSM), a decimation filter (e.g. a CIC filter) and a parallel-to-serial converter (compactor) may be combined to achieve an open-loop-based circuitry for controlling a frequency of a 24 GHz/77 GHz radar MMIC.

In various embodiments, a decimation filter (e.g. a CIC filter) and a parallel-to-serial converter (compactor) may be used for reducing a sampling frequency of a 1-bit bit stream generated by a delta-sigma modulator by a factor of two or more without any loss of (relevant) information.

Various embodiments may offer a low cost, low power and an easy solution for a 24-GHz MMIC frequency control and may improve/increase many possibilities in a field of autonomous/semi-autonomous driving of vehicles (e.g. cars).

The delta-sigma modulator may in various embodiments be capable to run at 320 MHz, such that higher signal-to-noise ratio (SNR) margins may be provided to accommodate for clock jitter and power supply noise through the pads, which may degrade an overall SNR. By increasing the modulator clock frequency from 160 MHz to 320 MHz, the application may gain up to 15 dB in SNR margin.

In various embodiments, a new method of controlling an external VCO with an open loop approach using a delta-sigma modulator is provided.

In various embodiments, a decimation filter and a parallel-to-serial converter (a compactor) with a delta-sigma modulator may be provided to reduce a data rate without introducing any noise.

In various embodiments, a compactor algorithm may be used to map a 2-bit data word (also referred to as sample) from the output of the decimation filter into a 1-bit sample.

In various embodiments, the decimation filter and the parallel-to-serial converter (the compactor) may only be used when the delta-sigma modulator is run at 320 MHz to lower the data rate which may be handled by the general purpose input/outputs.

The parallel-to-serial converter (the compactor) may be an algorithm that maps a two-bit data word (also referred to as a two-bit-sample) from the output of the decimation filter to a one-bit data word (also referred to as a one-bit-sample, single bit data word or single bit sample) at the output of the compactor.

In various embodiments, the data rate may be reduced by half from the output of the delta-sigma modulator to the output of the compactor For discussion purposes, the embodiments will be described as implementations of radar systems, but are not limited thereto. The embodiments, e.g. of circuits configured to generate a voltage and methods of generating a voltage, described herein are not limited to radar system implementations and may be used as standalone systems or may be implemented in other systems as would be understood by one of ordinary skill in the relevant arts.

Figure 3B:
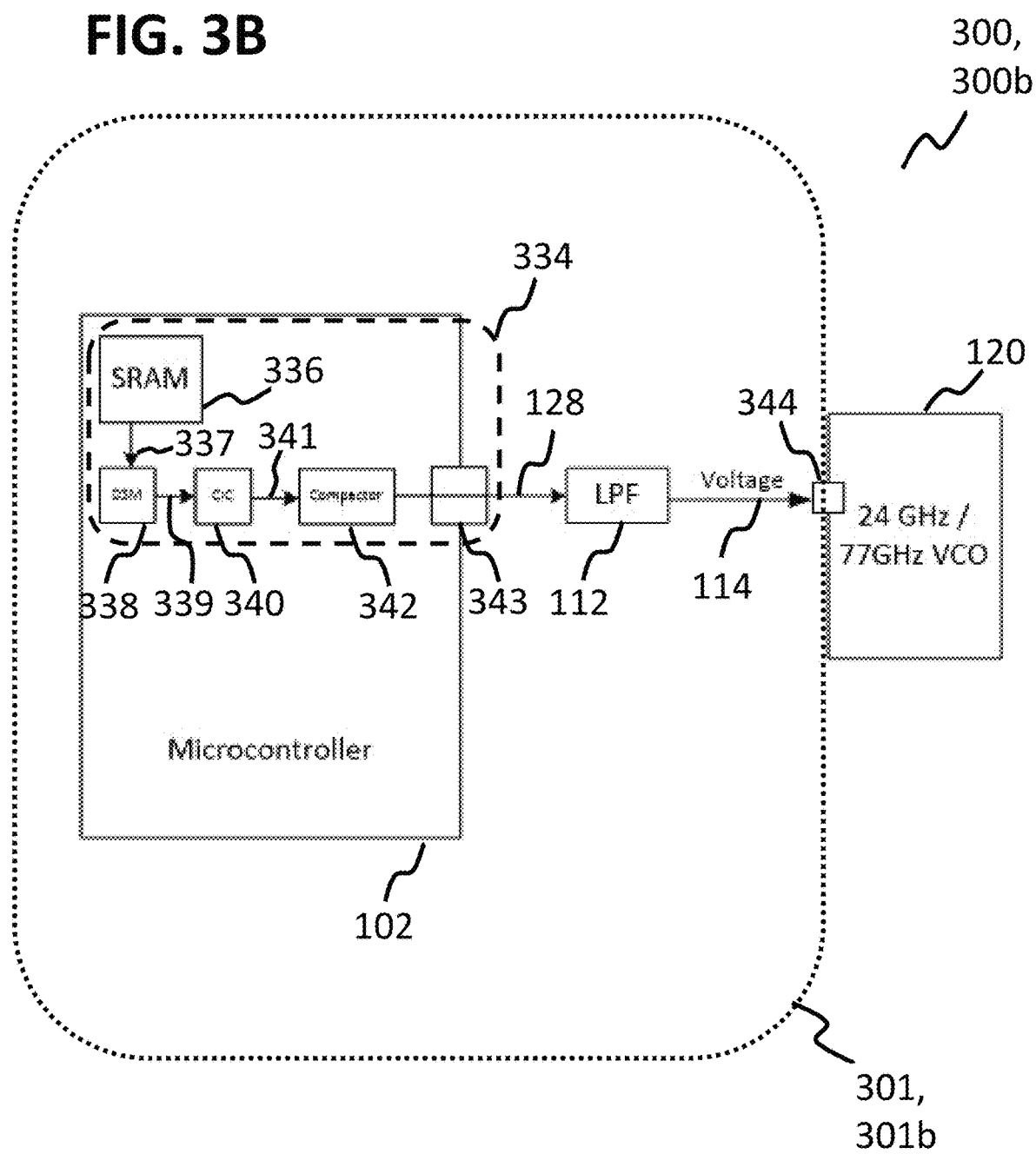
Figure 3C:
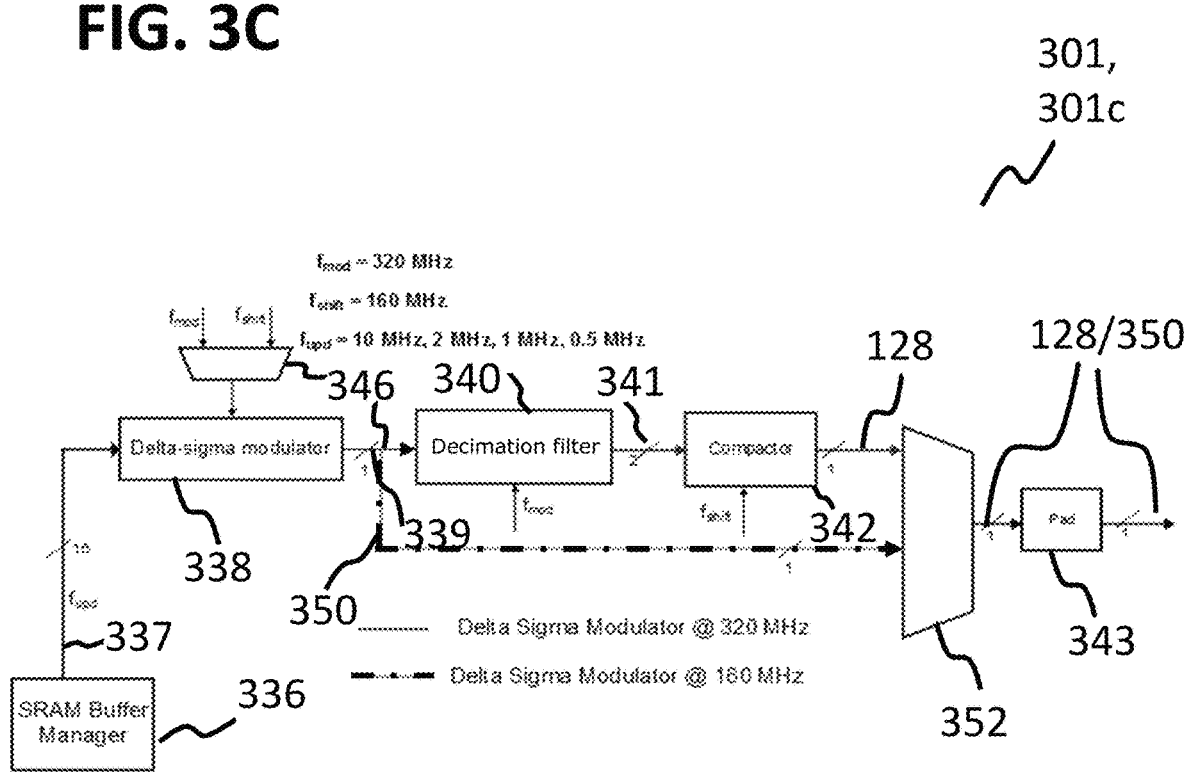
FIG. 3C shows a block diagram of a circuitry configured to generate a voltage in accordance with various embodiments.

FIGS. 3A and 3B each show a block diagram of a sensor system 300 (300a and 300b, respectively) including a circuitry 301 (301a and 301b respectively) configured to generate a voltage 114 in accordance with various embodiments;

FIG. 3C shows a block diagram of a circuitry 301c configured to generate a voltage 114 in accordance with various embodiments.

In various embodiments, the circuitry 301a, 301b, 301c may include a sequence generator 336 configured to provide a sequence of data words 337 consisting of bits, wherein the number of bits may be greater than two.

In various embodiments, the circuitry 301a, 301b, 301c may further include a delta-sigma modulator (DSM, ΔΣ modulator) 338 configured to receive the sequence of data words 337 provided by the sequence generator 336 and to provide a delta-sigma modulated first single bit data stream 339 at a first data rate.

In various embodiments, the circuitry 301a, 301b, 301c may further include a decimation filter 340 configured to create from the first single bit data stream 339 a stream 341 of decimated data words at a second data rate, wherein the second data rate may be smaller than the first data rate. Each of the decimated data words may include a plurality of bits.

In various embodiments, the circuitry 301a, 301b, 301c may further include a voltage generator 112 configured to provide a voltage 114 based on the second single bit data stream. 128.

The sequence generator 336, the delta-sigma modulator 338, the decimation filter 340 and the compactor 342 may, in various embodiments, be part of a microcontroller 102.

In various embodiments, the sequence generator 336 may include a data storage device, e.g. a memory device, for example a volatile memory device like a static random access memory (SRAM), or any other suitable type of memory device, for example a non-volatile memory device. A representation of analog voltage values for controlling the MMIC may be stored in the memory device, e.g. in the SRAM of the microcontroller 102. In various embodiments, the sequence of data words consisting of bits may be provided by creating the sequence of data words using a processor and storing the sequence using the data storage device of the sequence generator 336.

As shown in FIG. 3C, the sequence generator 336 may further include a buffer manager, in case of an SRAM memory device being used, the buffer manager may thus be an SRAM buffer manager.

The analog voltages for the controlling of the MMIC may be converted to digital values for being stored in the memory device of the sequence generator 336. In the embodiment of FIG. 3C, the voltage values may be stored in an SRAM as 16 bit data words, as indicated by the "16" next to the connecting line between the sequence generator 336 and the delta-sigma modulator 338. However, instead of the 16-bit data words, any other suitable bit number may be used for the data words provided by the sequence generator 336.

In various embodiments, the 16-bit digital data word may be loaded by a bit stream loader, which may be part of the sequence generator 336, e.g. of the SRAM and SRAM buffer manager block, to an input of the delta-sigma modulator 338.

In various embodiments, the delta-sigma modulator 338 may be a full feed-forward delta-sigma modulator 338 having an order that is the same as the number of bits of the decimated data words. In various embodiments, the full feed-forward delta-sigma modulator 338 may have an order that is different from (e.g. higher than) the number of bits of the decimated data words.

In the exemplary circuitries 301a, 301b, and 301c, a 2nd order full feed-forward delta-sigma modulator 338 may be used. The full feed-forward architecture may offer an advantage of higher stability due to the fact that inputs to integrators of the delta-sigma modulator 338 are a difference between the input and a feedback signal. Therefore, swings at the input of the integrators are much smaller than a full scale value. The feedback of the delta-sigma modulator 338 may be provided as an input to a digital-to-digital converter (DDC), which may convert a 1-bit output from a comparator of the delta-sigma modulator 338 to a 17-bit value to be subtracted from the input (not shown).

The 16 bit digital data words may, in various embodiments, be converted into a noise-shaped high-frequency 1-bit bit stream 339 by the delta-sigma modulator 338. This is indicated by the "1" label on the bit stream 339.

A pulse density of the generated bit stream 339 may depend on an absolute input level with respect to a full scale value.

A frequency of the delta-sigma modulator 338 and a cut-off frequency of a low-pass filter 112 (LPF, see below) of the circuitry 301 (or of the system 300) may define an effective oversampling ratio and thereby an SNR of the analog voltage. To meet higher SNR requirements, the delta-sigma modulator 338 may thus be running on a very high frequency, for example about 320 GHz (other suitable frequencies may be used instead). As a consequence, general purpose input/outputs 343 (GPIOs) of the microcontroller 102 may be required to support a very high-speed bit stream.

The higher SNR requirements may apply in order to provide higher signal-to-noise ratio (SNR) margins to accommodate for clock jitter and power supply noise through the pads, which may degrade an overall SNR. By increasing a clock frequency provided to the delta-sigma modulator 338 from, e.g., 160 MHz to 320 MHz, the application may gain up to 15 dB in SNR margin.

In order to ease this requirement, the decimation filter 340 may be used for decreasing a data rate. In the exemplary embodiment of FIG. 3C, the decimation filter 340 may decimate the stream 339 of single-bit data to a stream 341 of 2-bit decimated data words, as indicated by the "2" labelling the connecting arrow between the decimation filter 340 and the parallel-to-serial converter (the compactor) 342. In various embodiments, instead of decimating the single-bit data to two-bit data words, the single-bit data may be decimated to data words having different numbers of bits, e.g. four bits or any other suitable number of bits.

In various embodiments, the decimation filter 340 may be used to lower the data rate of the bit stream between the incoming single bit stream 339 (also referred to as the first single bit data stream 339) and the output two-bit data stream 341, for example by a factor of two or more.

In various embodiments, a cascaded-integrator-comb filter (CIC filter) 340 may be used as the decimation filter 340. Other suitable types of decimation filters may be used instead.

In various embodiments, each bit of the first single bit data stream 339 may have either a first data value or a second data value, and each of the decimated data words (of the stream 341 of decimated data words) may have a decimated data value representative of a percentage of first data values in an individual portion of the first single bit data stream 339. In various embodiments, a length of the individual portion and a number of bits of the decimated data word may correspond to a decimation factor and an order of the decimation filter. In various embodiments, the decimated data word may require fewer bits than the length of the individual portion of the first single bit data stream 339.

As an example, the following correspondence may be used by the decimation filter 340 for a conversion of a two-bit portion of the first single bit data stream 339 to two-bit decimated data words of the stream 341 of decimated data words. In the third column of Table 1, the percentage of first data values in the individual 2-bit portion of the first single bit data stream 339 is indicated.

TABLE 1

| Data values of 2-bit portion of first single bit data stream | Value of two-bit data word | Percentage of first data values in portion |
|---|---|---|
| 00 | 0 | 100% |
| 01 | 1 | 50% |
| 10 | 1 | 50% |
| 11 | 2 | 0% |

As a further example, the following correspondence may be used by the decimation filter 340 for a conversion of a four-bit portion of the first single bit data stream 339 to three-bit decimated data words of the stream 341 of decimated data words. In the third column of Table 2, the percentage of first data values in the individual portion of the first single bit data stream 339 is indicated.

TABLE 2

| Data values of 4-bit portion of first single bit data stream | Value of three-bit data word | Percentage of first data values in portion |
|---|---|---|
| 0000 | 0 | 100% |
| 0001 | 1 | 75% |
| 0010 | 1 | 75% |
| 0100 | 1 | 75% |
| 1000 | 1 | 75% |
| 0011 | 2 | 50% |
| 0101 | 2 | 50% |
| 1001 | 2 | 50% |
| 0110 | 2 | 50% |
| 1100 | 2 | 50% |
| 1010 | 2 | 50% |
| 1110 | 3 | 25% |
| 1101 | 3 | 25% |
| 1011 | 3 | 25% |
| 0111 | 3 | 25% |
| 1111 | 4 | 0% |

Other conversions between portions of a plurality of bits of the first single bit data stream 339 and data values of the multi-bit decimated data words may be constructed accordingly.

In various embodiments, the stream 341 of decimated data words may be the multi-bit stream, which cannot be connected to a (serial) output pad 343 of the circuitry 301 directly. In the exemplary embodiment of FIG. 3C, the output of the CIC filter 340 may be a 2-bit sample.

In various embodiments, the decimated data words may be converted back to a 1-bit sample using the parallel-to-serial converter 342 (the compactor 342).

In various embodiments, the parallel-to-serial converter 342 may be configured to convert the decimated data words to a second single bit data stream 128 while preserving the second data rate. Thus, the compactor may map the output of the decimation filter 340 (e.g., the CIC filter) to either a '0' or a '1'.

In various embodiments, the parallel-to-serial converter 342 may be configured to convert to the first data value all decimated data values representative of 100% of first data value, and, of all decimated data values representative of a percentage of more than 0% and less than 100% of first data values, only a fraction corresponding to the percentage.

In various embodiments, the parallel-to-serial converter 342 may be configured to convert to the second data value all decimated data values representative of 0% of first data values, and, of all the decimated data value representative of a percentage of more than 0% and less than 100% of first data values, the remaining data values not converted to the first data value.

FIGS. 4A and 4B show a mapping example 400 and a mapping algorithm 401, respectively, used by the parallel-to-serial converter 342 of a circuitry 301 configured to generate a voltage in accordance with various embodiments. Here, a two-bit portion of the first single bit data stream 339 may be converted to a two-bit data stream 341 using the mapping algorithm shown in FIG. 4B, which, for an input data stream 341 to the compactor 342 as shown in the top of FIG. 4A leads to an output data stream 128 from the compactor 342 as shown in the bottom of FIG. 4A.

For convenience, the mapping algorithm 401 for the two-bit-to-one-bit conversion is also reproduced in the following table.

TABLE 3

| Input to the compactor | Output of the compactor |
|---|---|
| $0_D$ | $0_B$ |
| $1_D$ | $0_B$ (at start or if previous output was 1) |
| $1_D$ | $1_B$ (if previous output was 0) |
| $2_D$ | $1_B$ |

As can be seen from FIG. 4A, FIG. 4B and Table 3, for the conversion of the two-bit data words that may have been provided as an output from the decimation filter 340, for example in accordance with Table 1, the single-bit data stream to be provided as output second single bit data stream 128 by the compactor 342 may be configured to reproduce the percentage of first data values included in the initial data stream 339 output by the delta-sigma modulator 338.

This means that, in the exemplary embodiment of the two-bit decimated data words, all decimated data values corresponding to 100% of first data values (e.g. '0's) may be converted to the first data value ('0'), and all decimated data values ('1') corresponding to 0% of first data values may be converted to the second data value ('1'). For the remaining two-bit decimated data values ('1') corresponding to 50% of first data values ('0's), it may be necessary to ensure that, in half the cases of occurrences of the two-bit decimated data value of '1', a conversion to the first data value ('0') is performed, and in the other half of the cases of occurrences of the two-bit decimated data value of '1', a conversion to the second data value ('1') is performed.

In various embodiments, the parallel-to-serial converter 342 may include at least one memory element (not shown), wherein the at least one memory element may be configured to register a number of occurrences of the decimated data value representative of a predefined percentage of more than 0% and less than 100% of first data values for converting only the fraction corresponding to the percentage to the first data value.

In the exemplary embodiment of the conversion from the stream 341 of two-bit decimated data words to the stream 128 of single-bit data words, the memory element may be configured to register when the two-bit decimated data value ('1') corresponding to 50% of first data values ('0's) is encountered and a conversion to the first data value ('0') is performed. A storage value of the memory element may be evaluated when a subsequent two-bit decimated data value ('1') corresponding to 50% of first data values ('0's) is encountered. If the storage value of the memory element indicates that last time, the conversion to the first data value ('0') was performed, a conversion to the second data value ('1') is performed, otherwise a conversion to the first data value ('0') is performed. Thereby, it may be ensured that 50% of the data values of the decimated data words that correspond to the 50% occurrence of the first data value are actually converted to the first data value, such that the percentage of first data values may be conserved between the first single bit data stream 339 and the second single bit data stream 128.

A similar process, involving the memory element, may be applied in a case of decimated data words having more than two bits. In various embodiments, only for a fraction of occurrences of a data value of the decimated data word corresponding to a percentage of first data values in the data portion may the data value of the second single-bit data stream 128 be set to the first data value. For the other occurrences, the data value of the second single-bit data stream 128 may be set to the second data value.

In an exemplary embodiment of the decimated data words having four bits, for example as shown in Table 2, for a decimated data value of '1', only in three out of four occurrences may the data value of the second single-bit data stream 128 be set to '0', for a decimated data value of '2', only for half of the occurrences may the data value of the second single-bit data stream 128 be set to '0' (similar to the two-bit case described above), and for a decimated data value of '3', only in one out of four occurrences may the data value of the second single-bit data stream 128 be set to '0'. The at least one memory element may be used for registering a number of occurrences of the respective decimated data values, wherein, for each of the different decimated data values, a different memory element may be provided.

In various embodiments, for example in a case of less than 50% of the data values of the second single-bit data stream 128 to be set to the first data value, the data values of the second single-bit data stream 128 may be set to the second data value upon a first occurrence of the data value of the decimated data word. Referring back to the exemplary embodiment of the four-bit decimated data values shown in Table 2, the data value of '3' may correspond to only a 25% occurrence of the first single-bit data value '0' in the first single-bit data stream 339. In this case, the second single-bit data value may for example be set to '1' upon a first occurrence of the data value '3', and may be set to '0' in 25% of the cases, for example upon a second, third, or fourth encounter of the data value '3'.

In various embodiments, the first data rate may be determined by a first clock signal having a first frequency $f_{mod}$ provided to the delta-sigma modulator 338. In various embodiments, the first data rate may be 320 Mbps.

In various embodiments, the second data rate may be lower than the first data rate at least by a factor corresponding to the number of bits in the decimated data word. For example, in a case of the first data rate being 320 Mbps (and correspondingly 320 Megasamples per second) and the decimation filter 340 applying a decimation by a factor two, e.g. from the single-bit data stream 339 to a stream 341 of two-bit decimated data words, the second data rate may for example be 320 Mbps (and correspondingly 160 Megasamples per second). In other words, in terms of Megabits/second, the data rate may remain the same (e.g. 320 Mbps), but expressed in terms of Megasamples/second, due to a sample size increase from 1-bit to 2-bit, the data rate, which may also be referred to as a sample rate, may be lowered, e.g. to 160 Megasamples/second. For other decimation factors, a ratio of data rates between the first data rate and the second data rate may differ from this example.

With the use of the decimation filter (e.g. the CIC filter) 340 and the compactor 342, the data rate may for example be reduced by half, and may thus be much easier to be handled by the IOs. This may also help in reducing a power consumption of the IOs, which may be a dominating power consumer for such a system.

In various embodiments, for such a digital logic, an area (e.g. a substrate area) required for such an implementation may be much smaller than for the conventional PLL-based solution.

As shown in FIG. 3C, in various embodiments, the circuitry 301 and/or a sensor system 300 including the circuitry 301 may further include a multiplexer 346 configured to provide to the delta-sigma modulator 338 either the first clock signal $f_{mod}$ or a second clock signal $f_{shift}$ having a second frequency lower than the first frequency. The circuitry 301 may further include a further multiplexer 352 passing on to the GPIO 343 either the input signal 128 processed by the decimation filter 340 and the compactor 342 or the input signal 350 provided directly by the delta-sigma-modulator 338. In various embodiments, the multiplexer 346 may further be configured to bypass the decimation filter 340 and the parallel-to-serial converter 342 in a case of the second frequency $f_{shift}$ being applied.

The second frequency may for example be 160 MHz, which may be sufficiently low for being handled by the input/output pads 343.

In other words, the decimation filter 340 and the compactor 342 may be used only in a case of the delta-sigma modulator 338 being run at the higher frequency of e.g. 320 MHz (at a frequency too high for the GPIOs 343) to lower the data rate which could be managed with the GPIOs 344. After the compactor 340, the data rate may for example be reduced by half, which may lead to a data rate that can be handled by the GPIOs 343.

To phrase it yet differently, when running the delta-sigma modulator 338 at 320 MHz, the output from the delta-sigma modulator 338 may have a data rate of 320 Mbps. This high data rate cannot be handled directly by general purpose input/output pads 343 (e.g., TC3XX pads). Therefore, the decimation filter 340 may be used to decimate the data rate from 320 Mbps to 160 Mbps (1 data word (sample) may correspond to 2 bit). Finally, the two-bit data word (sample) may be 'compacted' to 1 bit sample using compactor 342.

In various embodiments, the compactor 342 may not add any noise or any error into the second single bit stream 128.

In a case of the data rate starting at a low value, e.g. at around 160 MHz, the data rate may already be sufficiently low for being handled by the GPIOs 343. In that case, the decimation filter 340 and the compactor 342 may be bypassed. In other words, the delta-sigma modulator generated bit stream 339, with the decimation filter (e.g. CIC filter) 340 and the compactor 342 disabled, may be provided directly to the further multiplexer 352.

In various embodiments, as shown in FIG. 3A and FIG. 3B, the data stream 128 may be provided to the voltage generator 112, which may for example be a low-pass filter, for example similar to the voltage generator 112 as described in context with FIG. 1. Even though this is not shown in FIG.

3A and FIG. 3B, in the case of the low data rate being provided by the delta-sigma modulator 338, the single bit stream 350 provided by the further multiplexer 352 may be provided to the voltage generator 112. The voltage generator 112 may be configured to provide an analog voltage 114.

In various embodiments, as shown in FIG. 3A and FIG. 3B, the analog voltage 114 may be provided to a MMIC 120 for generating a radar signal 122 for detecting an object 126. The generating of the radar signal 122 using the provided analog voltage 114 may be performed as known in the art.

Figure 5:
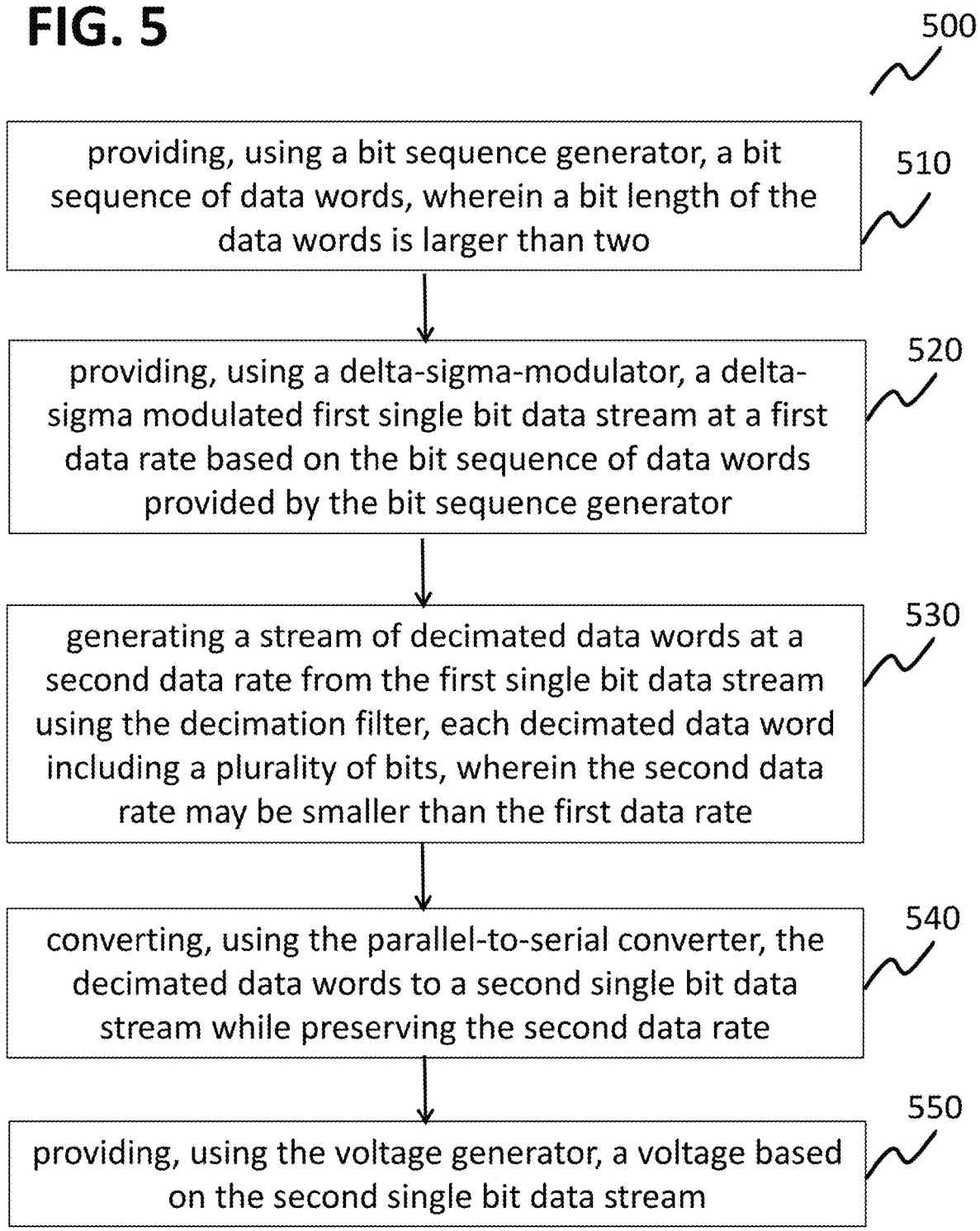
FIG. 5 shows a process flow of a method of generating a voltage in accordance with various embodiments.

FIG. 5 shows a process flow 500 of a method of generating a voltage in accordance with various embodiments.

In various embodiments, a method of generating a voltage using a circuitry is provided, the circuitry including a sequence generator, a delta-sigma modulator, a decimation filter, a parallel-to-serial converter, and a voltage generator.

The method may include providing, using the sequence generator, a sequence of data words consisting of bits, wherein the number of bits is greater than two (in 510), providing, using the delta-sigma modulator, a delta-sigma modulated first single bit data stream at a first data rate based on the sequence of data words provided by the sequence generator (in 520), generating a stream of decimated data words at a second data rate from the first single bit data stream using the decimation filter, each decimated data word including a plurality of bits, wherein the second data rate may be smaller than the first data rate (in 530), converting, using the parallel-to-serial converter, the decimated data words to a second single bit data stream while preserving the second data rate (in 540), and providing, using the voltage generator, a voltage based on the second single bit data stream (in 550).

In various embodiments, each bit of the first single bit data stream may have either a first data value or a second data value (e.g., '0' or '1'), and each of the decimated data words may have a decimated data value representative of a percentage of first data values in an individual portion of the first single bit data stream.

In various embodiments, a length of the individual portion may correspond to the number of bits of the decimated data word.

In various embodiments, as described above, the converting the decimated data words to the second single bit data stream may include converting to the first data value all decimated data values representative of 100% of first data values, and, of all decimated data value representative of a percentage of more than 0% and less than 100% of first data values, only a fraction corresponding to the percentage, and converting to the second data value all decimated data values representative of 0% of first data values, and, of all the decimated data value representative of a percentage of more than 0% and less than 100% of first data values, the remaining data values not converted to the first data value.

In various embodiments, the converting only the fraction corresponding to the percentage to the first data value may include registering a number of occurrences of the decimated data value representative of a predefined percentage of more than 0% and less than 100% of first data values.

In various embodiments, the providing the sequence of data words may include creating the sequence of data words using a processor and storing the sequence using a data storage device.

FIG. 6 shows a process flow 600 of a method of operating a sensor system in accordance with various embodiments.

The method may include providing a voltage using a voltage generator of a system of providing a voltage in accordance with various embodiments (in 610). In various embodiments, the method of providing a voltage as described above for various embodiments may be used. The method of operating a sensor system may further include generating a radar frequency signal based on the voltage provided by the voltage generator (in 620).

In various embodiments, a circuitry configured to generate a voltage is provided. The circuitry may include a sequence generator configured to provide a sequence of data words consisting of bits, wherein the number of bits may be greater than two, a delta-sigma modulator configured to receive the sequence of data words provided by the sequence generator and to provide a delta-sigma modulated first single bit data stream at a first data rate, a decimation filter configured to generate a stream of decimated data words from the first single bit data stream at a second data rate, wherein the second data rate may be smaller than the first data rate, each decimated data word including a plurality of bits, and a parallel-to-serial converter configured to convert the decimated data words to a second single bit data stream while preserving the second data rate.

In various embodiments, the circuitry may further include a voltage generator configured to provide a voltage based on the second single bit data stream.

In various embodiments, each bit of the first single bit data stream may have either a first data value or a second data value, and each of the decimated data words may have a decimated data value representative of a percentage of first data values in an individual portion of the first single bit data stream.

In various embodiments, a length of the individual portion may correspond to the number of bits of the decimated data word.

In various embodiments, the parallel-to-serial converter may be configured to convert to the first data value all decimated data values representative of 100% of first data values, and, of all decimated data value representative of a percentage of more than 0% and less than 100% of first data values, only a fraction corresponding to the percentage, and to convert to the second data value all decimated data values representative of 0% of first data values, and of all the decimated data value representative of a percentage of more than 0% and less than 100% of first data values, the remaining data values not converted to the first data value.

In various embodiments, the parallel-to-serial converter may include at least one memory element, wherein the at least one memory element may be configured to register a number of occurrences of the decimated data value representative of a predefined percentage of more than 0% and less than 100% of first data values for converting only the fraction corresponding to the percentage to the first data value.

In various embodiments, the first data rate may be determined by a first clock signal having a first frequency provided to the delta-sigma modulator.

In various embodiments, the second data rate may be lower than the first data rate at least by a factor corresponding to the number of bits of the decimated data word.

In various embodiments, the first data rate may be 320 Mbps.

In various embodiments, the delta-sigma modulator may be a full feed-forward delta-sigma modulator having an order that may be the same as the number of bits of the decimated data words.

In various embodiments, the bit sequence generator may include a data storage device.

In various embodiments, the number of bits of the decimated data words may be 2 or 4.

In various embodiments, a sensor system may be provided. The sensor system may include a circuitry in accordance with various embodiments, and a radar unit configured to generate a radar frequency signal based on the voltage provided by the voltage generator.

In various embodiments, the sensor system may further include a multiplexer configured to provide to the delta-sigma modulator either the first clock signal or a second clock signal having a second frequency lower than the first frequency, wherein the multiplexer may be further configured to bypass the decimation filter and the parallel-to-serial converter in a case of the second frequency being applied.

In various embodiments, the second frequency may be 160 MHz.

In various embodiments, a method of generating a voltage using a circuitry is provided, the circuitry including a bit sequence generator, a delta-sigma modulator, a decimation filter, a parallel-to-serial converter, and a voltage generator, the method including providing, using the bit sequence generator, a sequence of data words consisting of bits, wherein the number of bits may be larger than two, providing, using the delta-sigma modulator, a delta-sigma modulated first single bit data stream at a first data rate based on the sequence of data words provided by the bit sequence generator, generating a stream of decimated data words at a second data rate from the first single bit data stream using the decimation filter, each decimated data word including a plurality of bits, wherein the second data rate may be smaller than the first data rate, converting, using the parallel-to-serial converter, the decimated data words to a second single bit data stream while preserving the second data rate, and providing, using the voltage generator, a voltage based on the second single bit data stream.

In various embodiments, each bit of the first single bit data stream may have either a first data value or a second data value, and each of the decimated data words may have a decimated data value representative of a percentage of first data values in an individual portion of the first single bit data stream.

In various embodiments, a length of the individual portion may correspond to the number of bits of the decimated data word.

In various embodiments, the converting the decimated data words to the second single bit data stream may include converting to the first data value all decimated data values representative of 100% of first data values, and, of all decimated data value representative of a percentage of more than 0% and less than 100% of first data values, only a fraction corresponding to the percentage, and converting to the second data value all decimated data values representative of 0% of first data values, and, of all the decimated data value representative of a percentage of more than 0% and less than 100% of first data values, the remaining data values not converted to the first data value.

In various embodiments, the converting only the fraction corresponding to the percentage to the first data value may include registering a number of occurrences of the decimated data value representative of a predefined percentage of more than 0% and less than 100% of first data values.

In various embodiments, the providing the sequence of data words may include creating the sequence of data words using a processor and storing the sequence using a data storage device.

In various embodiments, a method of operating a sensor system is provided, the sensor system including a circuitry according to various embodiments configured to execute a method in accordance with various embodiments, and a radar unit, the method including generating a radar frequency signal based on the voltage provided by the voltage generator.

In various embodiments, the sensor system may further include a multiplexer configured to provide to the delta-sigma modulator either the first clock signal having a first frequency or a second clock signal having a second frequency lower than the first frequency, and the method may further include determining whether the first clock signal or the second clock signal is applied, and in a case of determining that the second clock signal is applied, bypassing the decimation filter and the parallel-to-serial converter.

In various embodiments, the first frequency may be 320 MHz and/or the second frequency may be 160 MHz.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes that come within the meaning and range of equivalency of the claims are therefore intended to be embraced.

Various aspects of the disclosure are provided for devices, and various aspects of the disclosure are provided for methods. It will be understood that basic properties of the devices also hold for the methods and vice versa. Therefore, for sake of brevity, duplicate description of such properties may have been omitted.

What is claimed is:

1. A circuitry configured to generate a voltage, comprising:
    a sequence generator configured to provide a sequence of digital data words consisting of bits, wherein the number of bits is greater than two;
    a delta-sigma modulator configured to receive the sequence of digital data words provided by the sequence generator and to provide a delta-sigma modulated first single bit data stream at a first data rate;
    a decimation filter configured to generate, from the first single bit data stream at the first data rate, a stream of decimated data words at a second data rate, wherein the second data rate is smaller than the first data rate, each decimated data word comprising a plurality of bits; and
    a parallel-to-serial converter configured to convert the decimated data words to a second single bit data stream while preserving the second data rate.

2. The circuitry of claim 1, wherein each bit of the first single bit data stream has either a first data value or a second data value, and wherein each of the decimated data words has a decimated data value representative of a percentage of first data values in an individual portion of the first single bit data stream.

3. The circuitry of claim 2,
    wherein the parallel-to-serial converter is configured to convert the decimated data words to the first data value according to:
        all decimated data values representative of 100% of the individual portion of the first single bit data stream includes first data values; and
        only a fraction of all decimated data values representative of a percentage of more than 0% and less than 100% of the individual portion of the first single bit data stream includes first data values, the fraction corresponding to the percentage;

and wherein the parallel-to-serial converter is configured to convert the decimated data words to the second data value according to:
all decimated data values representative of 0% of the individual portion of the first single bit data stream includes first data values, and
remaining decimated data values representative of a percentage of more than 0% and less than 100% of the individual portion of the first single bit data stream includes first data values, the remaining decimated data values include the decimated data values not converted to the first data value.

4. The circuitry of claim 3, wherein the parallel-to-serial converter comprises at least one memory element, wherein the at least one memory element is configured to register a number of occurrences of the decimated data value representative of a predefined percentage of more than 0% and less than 100% of first data values for converting only the fraction corresponding to the percentage to the first data value.

5. The circuitry of claim 1, wherein the first data rate is determined by a first clock signal having a first frequency provided to the delta-sigma modulator.

6. The circuitry of claim 1, wherein the second data rate is lower than the first data rate at least by a factor corresponding to the number of bits of the decimated data word.

7. The circuitry claim 1, wherein the first data rate is 320 Mbps.

8. The circuitry of claim 1, wherein the delta-sigma modulator is a full feed-forward delta-sigma modulator having an order that is the same as the number of bits of the decimated data words.

9. The circuitry of claim 1, wherein the sequence generator comprises a data storage device.

10. The circuitry of claim 1, wherein the number of bits of the decimated data words is 2 or 4.

11. A sensor system, comprising:
a circuitry configured to generate a voltage, the circuitry comprising:
a sequence generator configured to provide a sequence of digital data words consisting of bits, wherein the number of bits is greater than two;
a delta-sigma modulator configured to receive the sequence of digital data words provided by the sequence generator and to provide a delta-sigma modulated first single bit data stream at a first data rate;
a decimation filter configured to generate, from the first single bit data stream at the first data rate, a stream of decimated data words at a second data rate, wherein the second data rate is smaller than the first data rate, each decimated data word comprising a plurality of bits; and
a parallel-to-serial converter configured to convert the decimated data words to a second single bit data stream while preserving the second data rate;
a voltage generator configured to provide a voltage based on the second single bit data stream; and
a radar unit configured to generate a radar frequency signal based on the voltage provided by the voltage generator.

12. The sensor system of claim 11, further comprising:
a multiplexer configured to provide to the delta-sigma modulator either the first clock signal or a second clock signal having a second frequency lower than the first frequency, wherein the multiplexer is further configured to bypass the decimation filter and the parallel-to-serial converter in a case of the second frequency being applied.

13. The sensor system of claim 12, wherein the second frequency is 160 MHz.

14. The sensor system of claim 12, wherein the first frequency is 320 MHz and/or wherein the second frequency is 160 MHz.

15. A method of generating a voltage using a circuitry, the method comprising:
providing, using a sequence generator, a sequence of digital data words consisting of bits, wherein the number of bits is greater than two;
providing, using a delta-sigma modulator, a delta-sigma modulated first single bit data stream at a first data rate based on the bit sequence of digital data words provided by the sequence generator;
generating, using a decimation filter, a stream of decimated data words at a second data rate from the first single bit data stream, each decimated data word comprising a plurality of bits, wherein the second data rate is smaller than the first data rate;
converting, using a parallel-to-serial converter, the decimated data words to a second single bit data stream while preserving the second data rate; and
providing, using a voltage generator, a voltage based on the second single bit data stream.

16. The method of claim 15, wherein each bit of the first single bit data stream has either a first data value or a second data value, and wherein each of the decimated data words has a decimated data value representative of a percentage of first data values in an individual portion of the first single bit data stream.

17. The method of claim 16, wherein the converting the decimated data words to the second single bit data stream comprises:
converting the decimated data words to the first data value according to:
all decimated data values representative of 100% of the individual portion of the first single bit data stream includes first data values; and
only a fraction of all decimated data values representative of a percentage of more than 0% and less than 100% of the individual portion of the first single bit data stream includes first data values, the fraction corresponding to the percentage;
and converting the following decimated data values to the second data value:
all decimated data values representative of 0% of the individual portion of the first single bit data stream includes first data values, and
remaining decimated data values representative of a percentage of more than 0% and less than 100% of the individual portion of the first single bit data stream includes first data values, the remaining decimated data values include the decimated data values not converted to the first data value.

18. The method of claim 17, wherein the converting only the fraction corresponding to the percentage to the first data value comprises registering a number of occurrences of the decimated data value representative of a predefined percentage of more than 0% and less than 100% of first data values.

19. The method of claim 15, wherein the providing the sequence of data words comprises creating the sequence of data words using a processor and storing the sequence using a data storage device.

20. A sensor system, the sensor system comprising:
a circuitry configured to generate a voltage, the circuitry comprising:
- a sequence generator configured to provide a sequence of digital data words consisting of bits, wherein the number of bits is greater than two;
- a delta-sigma modulator configured to receive the sequence of digital data words provided by the sequence generator and to provide a delta-sigma modulated first single bit data stream at a first data rate;
- a decimation filter configured to generate, from the first single bit data stream at the first data rate, a stream of decimated data words at a second data rate, wherein the second data rate is smaller than the first data rate, each decimated data word comprising a plurality of bits; and
- a parallel-to-serial converter configured to convert the decimated data words to a second single bit data stream while preserving the second data rate; and
a voltage generator configured to provide a voltage based on the second single bit data stream.

21. The sensor system of claim 20, further comprising:
a multiplexer configured to:
- provide to the delta-sigma modulator either a first clock signal having a first frequency or a second clock signal having a second frequency lower than the first frequency, wherein the multiplexer is further configured to:
  - determine whether the first clock signal or the second clock signal is applied;
  - in a case of determining that the second clock signal is applied, bypass the decimation filter and the parallel-to-serial converter.

* * * * *